US011880764B2

(12) United States Patent
Kazerounian et al.

(10) Patent No.: US 11,880,764 B2
(45) Date of Patent: Jan. 23, 2024

(54) METHOD, PRODUCT, AND SYSTEM FOR DETECTING MALICIOUS NETWORK ACTIVITY USING A GRAPH MIXTURE DENSITY NEURAL NETWORK

(71) Applicant: Vectra AI, Inc., San Jose, CA (US)

(72) Inventors: Sohrob Kazerounian, Somerville, MA (US); Daniel Carlton Hannah, Melrose, MA (US); Tuomas P. Oikarinen, Boston, MA (US)

(73) Assignee: Vectra AI, Inc., San Jose, CA (US)

( * ) Notice: Subject to any disclaimer, the term of this patent is extended or adjusted under 35 U.S.C. 154(b) by 305 days.

(21) Appl. No.: 16/948,574

(22) Filed: Sep. 23, 2020

(65) Prior Publication Data

US 2021/0092140 A1 Mar. 25, 2021

Related U.S. Application Data

(60) Provisional application No. 62/905,273, filed on Sep. 24, 2019.

(51) Int. Cl.
*G06N 3/08* (2023.01)
*H04L 9/40* (2022.01)
(Continued)

(52) U.S. Cl.
CPC ......... *G06N 3/08* (2013.01); *G06F 18/21342* (2023.01); *G06N 3/045* (2023.01);
(Continued)

(58) Field of Classification Search
CPC ............. H04L 63/1425; H04L 63/1416; H04L 63/1483; H04L 41/16; H04L 45/08;
(Continued)

(56) References Cited

U.S. PATENT DOCUMENTS 10,326,672 B2 * 6/2019 Scheib ................. H04L 43/062
11,562,186 B2 * 1/2023 Goyal ..................... G06F 18/00
(Continued)

OTHER PUBLICATIONS

Aaron Tuor et al. "Deep Learning for Unsupervised Insider Threat Detection in Structured Cybersecurity Data Streams" p. 1, Right col. Lines 2-7, and p. 4, Left col. Line 37-38 (Year: 2017).*
(Continued)

*Primary Examiner* — Farid Homayounmehr
*Assistant Examiner* — Mudasiru K Olaegbe
(74) *Attorney, Agent, or Firm* — Vista IP Law Group, LLP

(57) ABSTRACT

Disclosed is an approach for detecting malicious network activity (e.g. based on a data hoarding activity identifies using a graph mixture density neural network (GraphMDN)). Generally, the approach includes generating embeddings using a graph convolution process and then processing the embeddings using a mixture density neural network. The approach may include collecting network activity data, generating a graph representing the network activity, or an aggregation thereof that maintains the inherent graphical nature and characteristics of the data, and training a GraphMDN in order to generate pluralities of distributions characterizing one or more aspects of the graph representing the network activity. The approach may also include capturing new network activity data, and evaluating that data using the distributions generated by the trained GraphMDN, and generation corresponding detection results.

20 Claims, 7 Drawing Sheets

(51) Int. Cl.
*G06F 18/2134* (2023.01)
*G06N 3/045* (2023.01)

(52) U.S. Cl.
CPC ...... *H04L 63/1416* (2013.01); *H04L 63/1425* (2013.01); *H04L 63/1483* (2013.01)

(58) Field of Classification Search
CPC .. H04L 45/851; G06K 9/6242; G06N 3/0454; G06N 3/0472; G06N 3/08; G06N 20/00; H04W 12/12
See application file for complete search history.

(56) References Cited

U.S. PATENT DOCUMENTS

| | | | | |
|---|---|---|---|---|
| 2013/0117278 | A1* | 5/2013 | Martens | G06Q 20/384 707/758 |
| 2016/0005391 | A1* | 1/2016 | Agiomyrgiannakis | G10L 13/08 704/260 |
| 2016/0359697 | A1* | 12/2016 | Scheib | H04L 9/3239 |
| 2017/0099200 | A1* | 4/2017 | Ellenbogen | G06V 10/764 |
| 2018/0060701 | A1* | 3/2018 | Krishnamurthy | G06N 3/045 |
| 2018/0103052 | A1* | 4/2018 | Choudhury | H04L 63/20 |
| 2018/0189805 | A1* | 7/2018 | Lebesis | G06Q 30/0269 |
| 2018/0349526 | A1* | 12/2018 | Atsmon | G06N 3/08 |
| 2019/0124045 | A1 | 4/2019 | Zong et al. | |
| 2019/0236450 | A1* | 8/2019 | Li | G06N 3/045 |
| 2020/0089953 | A1* | 3/2020 | Newcombe | G06F 3/011 |

OTHER PUBLICATIONS

Mounce et al, "Development and Verification of an Online Artificial Intelligence System for Detection of Bursts and Other Abnormal Flows" p. 3, Right col. Lines 48-53 (Year: 2009).*
European Search Report dated Feb. 18, 2021 for EP Appln. No. 20197616.4.
Tuor, Aaron, et al. "Deep learning for unsupervised insider threat detection in structured cybersecurity data streams." arXiv preprint arXiv:1710.00811 (2017).
Mounce, S. R., J. B. Boxall, and J. Machell. "Development and verification of an online artificial intelligence system for detection of bursts and other abnormal flows." Journal of Water Resources Planning and Management 136.3 (2010): 309-318.
Bishop, C., "Mixture density networks," Technical Report NCRG/94/004, Neural Computing Research Group, Aston University, Feb. 1994.
Foreign OA for EP Patent Appln. No. 20197616.4 dated Jan. 25, 2023.
Foreign Response for EP Patent Appln. No. 20197616.4 dated Jul. 23, 2023.

* cited by examiner

METHOD, PRODUCT, AND SYSTEM FOR DETECTING MALICIOUS NETWORK ACTIVITY USING A GRAPH MIXTURE DENSITY NEURAL NETWORK

CROSS-REFERENCE TO RELATED APPLICATION(S)

The present application claims the benefit of priority to U.S. Provisional Application No. 62/905,273, entitled "METHOD, PRODUCT, AND SYSTEM FOR DETECTING MALICIOUS NETWORK ACTIVITY USING A GRAPH MIXTURE DENSITY NEURAL NETWORK" filed on Sep. 24, 2019, which is hereby incorporated by reference in its entirety.

BACKGROUND

Although recent advances in deep learning have yielded impressive results across domains as widely varying as speech and language, computer vision, and control, deep learning models haven't been able to easily model data from arbitrary graph structured inputs. This shortcoming becomes particularly apparent when considered in light of the sheer number of important real-world datasets that are inherently graph structured. These include social networks, structured text, knowledge graphs, molecule and protein structure/prediction, computer networks and network security.

Neural networks and deep learning are most typically used in two types of prediction tasks—classification and regression. In both classification and regression, deep learning architectures have been developed that operate over static input data (with feed-forward neural networks), images (with convolutional neural networks), and sequences (with recurrent neural networks).

Additionally, some algorithms have in fact been used to make predictions over graphs. In general, attempts make predictions over graphs have been limited to capturing structural information in the graph through hand-engineered features. However, hand engineered features fail to represent a lot of the potentially relevant information therein, this is because they are limited to intuitions an engineer may have about the structure of the input. For example, in predicting whether a user in a social network is likely to be a malicious actor, one might discard any graph structure altogether or incorporate graph information into user attributes—e.g. how many friends the user has in the network. Yet these hand-engineered features undermine the advantages of deep learning in the first place, namely the ability to learn complex hierarchical feature representations uniquely suited to a particular task (such as classifying users or predicting numerical values).

Moreover, the performance of a neural network trained on an "inverse" problem, where the target values can take multiple values in response to a single input, is far from accurate. In the case of the inverse data, the neural network attempts to learn a function that approximates the average of the multiple target values given some input value, which is generally not only wrong but often misleading.

One way to address this problem would possibly be to use a mixture density neural network (MDN). This is because an MDN would instead output the parameters of a mixture of distributions which represent the more complex distributions seen in inverse problems.

In the context of detecting malicious network activity (e.g. data exfiltration preparation), the prior approaches fail to incorporate graph-based features of the data and/or provide information that could otherwise produce predictions that more accurately represent real world behavior. For example, in the context of classification and regression, the output is merely a singular representation of the result or a class identification. Additionally, the MDN may also provide a more nuanced result comprising one or more distributions but also fails to ingest the inherent graph-based characteristics, instead the MDN operates on aggregate data. However, aggregate data would likely not capture a scenario where the average data transfer rate stays the same, but where one device accounts for an inordinate amount of that data transfer, which might correspond to malicious network activity (e.g. data exfiltration behavior).

Therefore, what is needed is an improved approach for detecting malicious network activity that accounts for inherently graph structured arrangements.

SUMMARY

The method, product, and system for detecting malicious network activity using a graph mixture density neural network.

In some embodiments, the approach includes the detection of malicious network activity (e.g. based on a data hoarding activity identified using a graph mixture density neural network (GraphMDN)) as will be described herein. Additionally, the approach may include collecting network activity data, generating a graph representing the network activity, or an aggregation thereof that maintains the inherent graphical nature and characteristics of the data, and training a GraphMDN in order to generate pluralities of distributions characterizing one or more aspects of the graph representing the network activity. In some embodiments, the approach includes capturing new network activity data, and evaluating that data using the distributions generated by the trained GraphMDN, and generation corresponding detection results.

Further details of aspects, objects, and advantages of some embodiments are described below in the detailed description, drawings, and claims. Both the foregoing general description and the following detailed description are exemplary and explanatory and are not intended to be limiting as to the scope of the embodiments.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. These drawings depict only typical embodiments of the invention and are not therefore to be considered limiting of its scope, the invention will be described and explained with additional specificity and detail using the accompanying drawings.

DETAILED DESCRIPTION

Various embodiments of the invention are directed to a method for privileged account breach detections based on behavioral access patterns.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items.

Figure 1A:
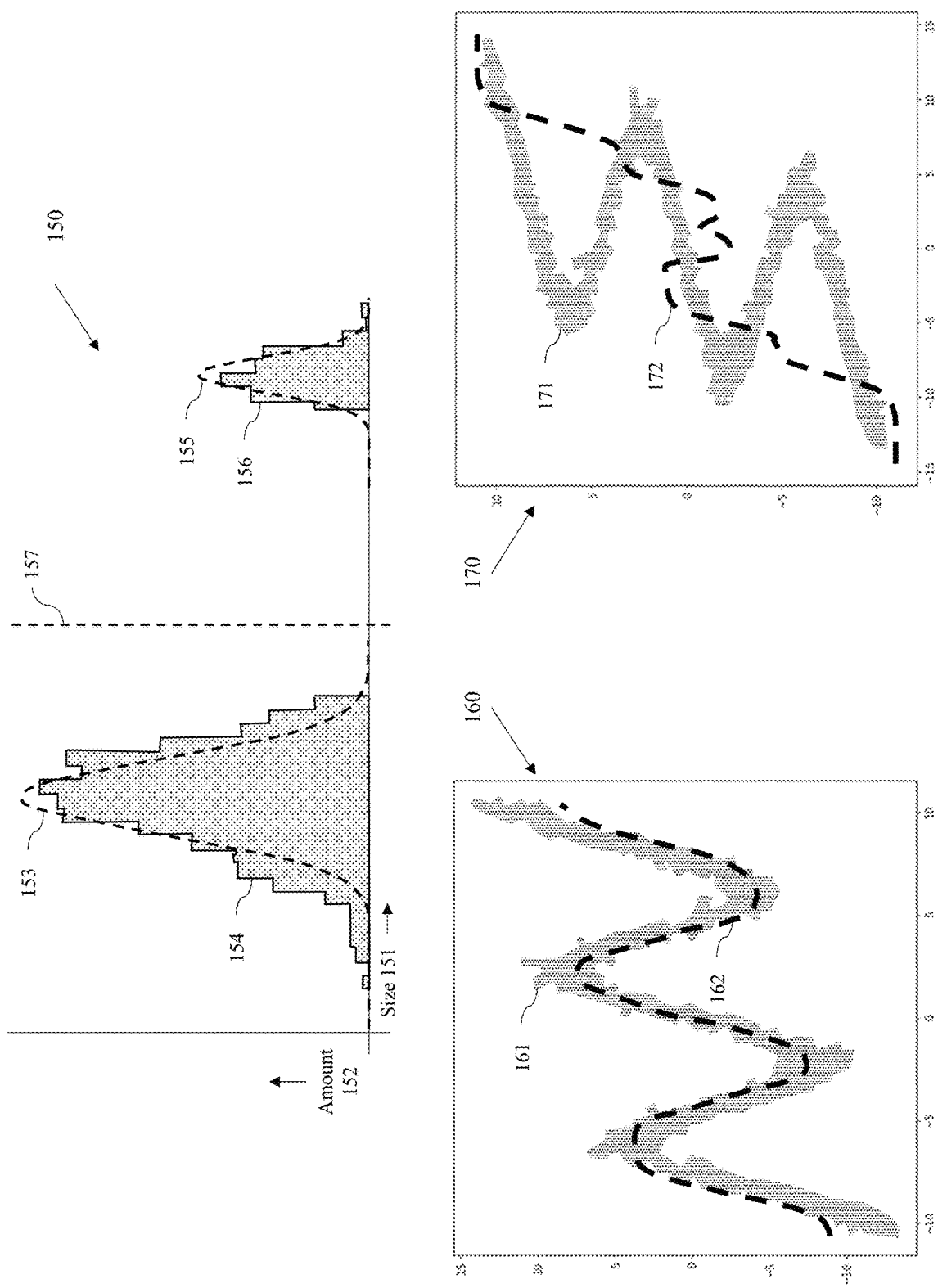
FIG. 1A illustrates some of the issues with possible artificial intelligence techniques to detect malicious activity according to some embodiments.

FIG. 1A illustrates some of the issues with possible artificial intelligence techniques to detect malicious activity according to some embodiments. When building an anomaly detector, the learning of an average may be problematic. Consider a computer which transfers and receives relatively small (e.g., 10-500 MB) amounts of data to/from other machines on the network very frequently (see 154), but also backs up a large folder of data (~2 GB) every night (see 156) to a local backup server. The distribution of typical file sizes will be multimodal and will resemble the distribution at 150. When trained, a standard neural network (even a standard graph neural network) using the features describing the example computer as an input and all of the sizes of its data transfers to/from other machines as outputs, the neural network will learn to predict that the example computer transfers/receives an amount of data equal to the average of all the file transfer sizes, shown as at 157. An anomaly detection model built using such a network would interpret a file transfer matching the predicted amount (e.g. 157) that the computer in question "should" send as not anomalous. However, files sizes corresponding to 157 are actually quite atypical for the computer in question as it has never transferred this amount of data before. Thus, it should certainly be an anomaly.

By learning to associate a single input (the features that describe the computer) with a distribution of outputs (see 150), a mixture density network can more accurately learn what amounts of data are typical, and what amounts are not. For instance, an example output from a mixture density neural network (MDN) might represent the two distributions as two gaussian curves (153 and 155).

Additionally, a simple feed-forward neural network after training can reasonably accurately represent a dataset that has singular inputs that correspond to singular outputs. For example, graph 160 illustrates a set of input data along a horizontal axis and a corresponding set of output data along a vertical axis, as represented by data distribution 161. As can be seen from the graph 160 each piece of input corresponds to one output. A feed-forward neural network trained on the dataset will essentially find the average output value for each input value as represented by 162.

However, the performance of a feed-forward neural network trained on an "inverse" problem where the target values can take multiple values in response to a single input is at best inaccurate if not entirely misleading. For example, graph 170 shows an inversion of the data distribution 161 (see inverted data distribution 171). As can be seen, for any given input value there can be any of one to five different distributions. However, a feed-forward neural network would merely attempt to find the average of these values as represented by 172. However, this largely fails to track the inverted data distribution 172.

Figure 1B:
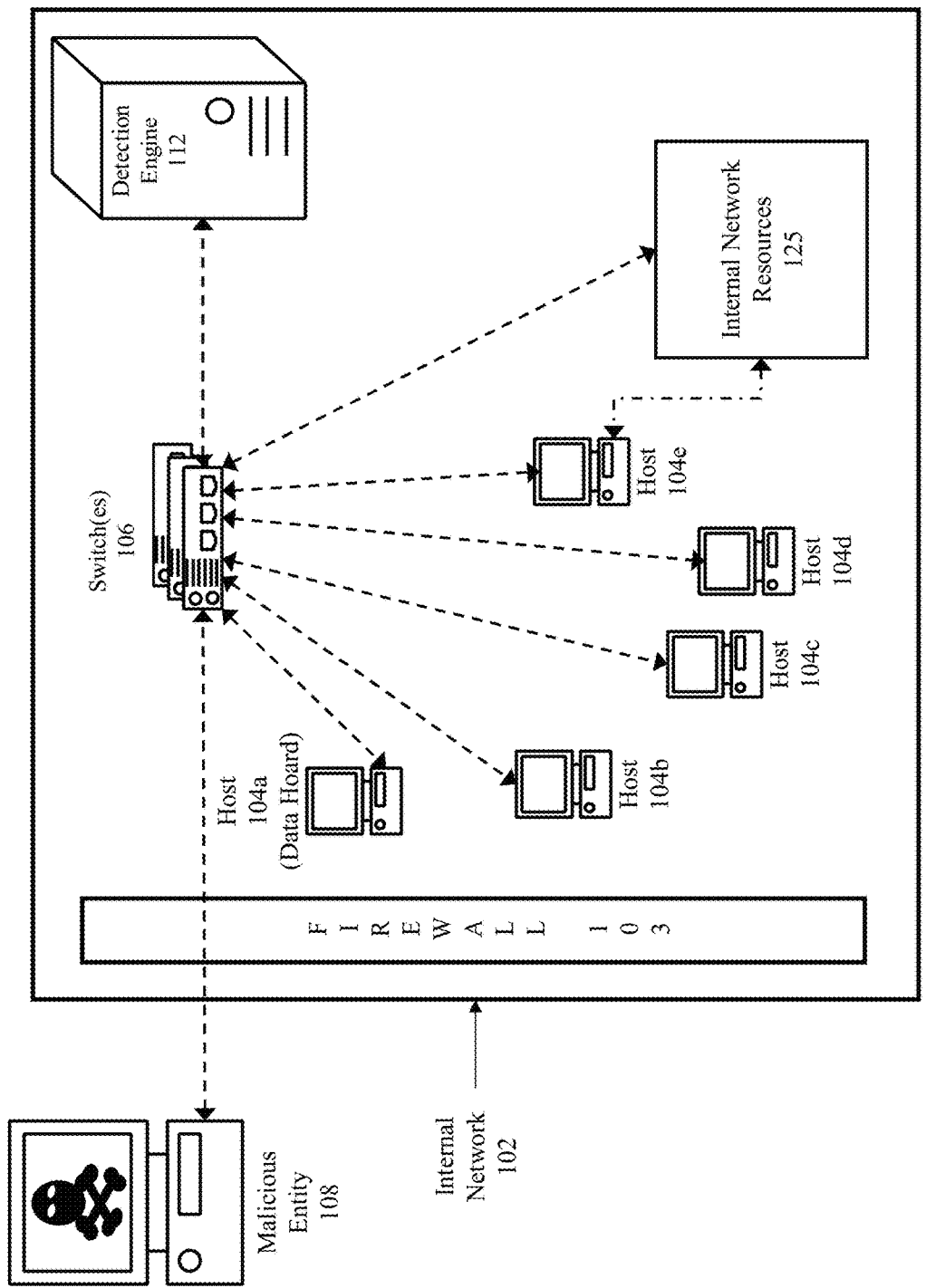
FIG. 1B illustrates an example environment(s) and malicious activity detection scenario in which some embodiments of the invention are implemented.

One possible solution to this is to use a mixture density neural network which provides one or more gaussian distributions along with mixing coefficients. However, MDNs have not previously been extended to operate across graphs. The present approach describes how to create a graph mixture density neural network (GraphMDN) that operates on graph data. In particular, the following figures describe GraphMDNs and their use in the context of detection of malicious network activity, which will be discussed here generally in the context of detection of malicious data hoarding behavior prior to exfiltration. FIG. 1B provides contextual information for a use case of the GraphMDN in the field of computer networks and network security.

FIG. 1B illustrates an example environment(s) and malicious activity detection scenario in which some embodiments of the invention are implemented. In particular, the figure illustrates a host being used to create a data hoard, where that host might be acting as a staging point for exfiltration of data collected from hosts and/or other internal network resources.

Generally, a malicious entity might attempt to gain access to an internal network 102 to obtain data that the internal network operator(s) do not intent to be provided to the malicious entity. For instance, an external malicious entity 108 may attempt to gain access to the internal network 102 through a firewall 103. Normally, malicious entities use any of several methods to gain access to a network. For example, a malicious entity can gain access by social methods (e.g. tricking, bribing, phishing, infiltrating, dumpster diving, physically stealing, etc.), brute force methods to identify (generally weak) passwords, physical access to a machine (e.g. a machine left unattended in a public area), or other technical methods that focuses on leveraging vulnerabilities at the software or hardware level (e.g. backdoors, buffer overflow attacks, email worm, root kits, session hijacking, and trojan horse programs). Regardless of the method used, the initial goal is to gain a footprint within the internal network that can be accessed by the malicious entity 108 external to the network. For instance, the malicious entity 108 gains access at a host 104$a$ that is used to communicate through firewall 103.

In some embodiments, a malicious entity has direct access to an internal network and thus avoids the challenge of overcoming the protections of a firewall (see 103). For instance, a malicious entity (108) may correspond to an employee undertaking a course of action adverse to their employer (operator/owner of the internal network)—e.g. corporate espionage, trade secret theft, accessing restricted materials, etc. In some embodiments, the malicious entity has no actual malice and is instead merely an individual engaging in abnormal, risky, reckless, or otherwise undesirable activity that may pose a risk to network resources. For example, an administrator using a publicly accessible kiosk to stage documents for transfer to a nearby device.

Whether an external actor (e.g. malicious entity 108) or an internal actor (e.g. entity controlling host 104*a*), the malicious entity might also gain access to other hosts to use those hosts to relay data from other network resources (e.g. internal network resources 125) to which they do not have direct access. To illustrate, the malicious entity steals credentials for host 104*e* to use host 104*e* to access internal resources (e.g. internal network resources 125) that host 104*a* does not have authorization to access but that host 104*e* does have authorization to access (e.g. a printer used in the executive office for printing internal engineering documents, confidential contracts, unreleased copyright material, etc.). Furthermore, the actor might attempt to acquire data directly from individual hosts such as host 104*b-e*, where the hosts may comprise any of a user's machine, a machine providing a service (e.g. exchange email server or customer management system), or a host making a resource available (e.g. an file transfer protocol server (FTP) or human resources file sharing service).

In some embodiments, the network itself is an arrangement of electronically connected (either wired, wireless, or some combination thereof). For example, one or more switches 106 and/or wireless receiver/transmitter devices are provided to connect the hosts (e.g. hosts 104*a-e*) and the internal network resources (e.g. 125) and a detection engine 112.

In some embodiments, the detection engine 112 includes a sensing module(s) for capturing information regarding communications over the internal network. The detection engine 112 might capture unique host identifiers, sources of communications, destinations of communications, the amount of data sent, the amount of data received, and the port(s) used for communication. The capture of this information might be accomplished by the detection engine 112, using multiple distributed sensing modules (taps) located at different locations (e.g. switch(es) 106, host(s) 104*a-e*, and/or at internal network resources). The sensing modules can identify relevant information for use by the remainder of the detection engine 112 as indicated above and may also include a requested service, a corresponding protocol, whether a communication is a request or a response, the time of the communication, or any other relevant information. In some embodiments, the sensing module(s) is not part of the detection engine but is otherwise used to capture relevant information that is then provided for use by the detection engine 112. Usually, the information is retrieved from captured network packets at one or more network devices (e.g. switches 106, host(s) 104*a-e*, and/or internal network resources). The operation of the detection engine 112 is discussed further below at least in regard to FIG. 5.

Figure 2:
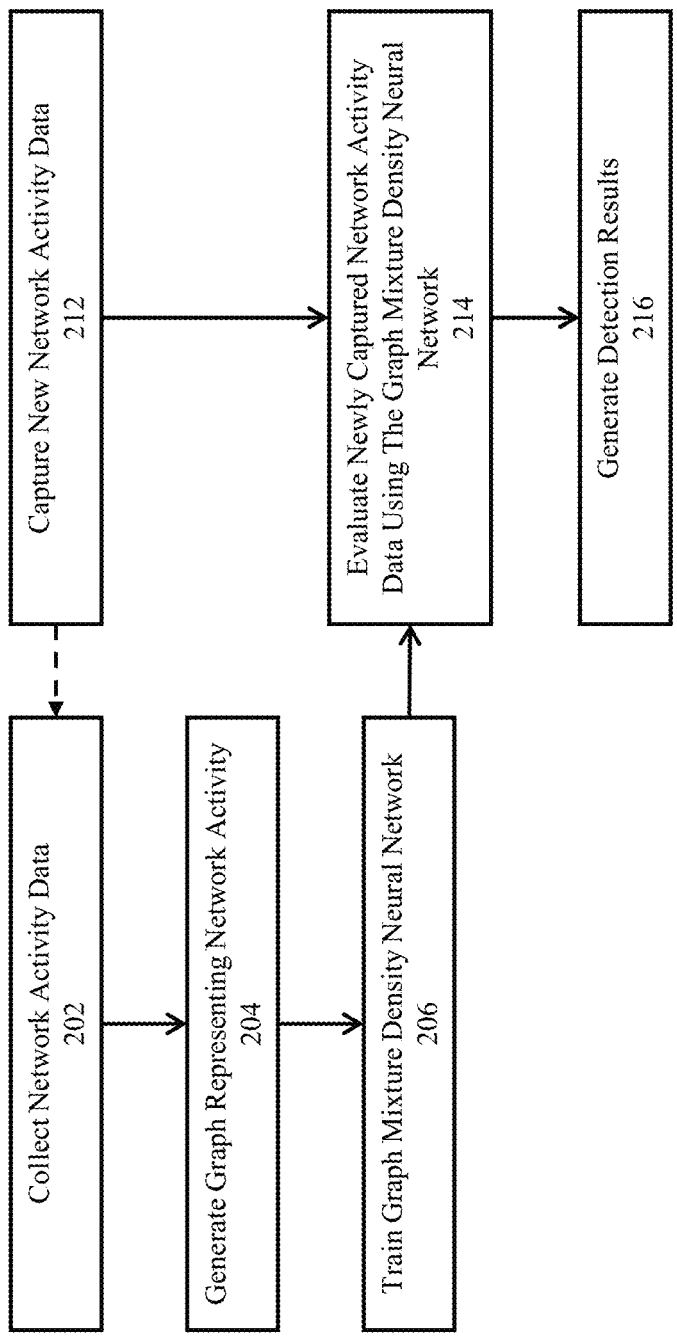
FIG. 2 illustrates a process flow according to some embodiments of the invention.

FIG. 2 illustrates a process flow according to some embodiments of the invention. Specifically, FIG. 2 illustrates a process flow implemented by the detection engine 112 discussed above, and in some embodiments, one or more sensing modules. Generally, the flow includes a first stage comprising collecting network activity data, generating a graph representing the network activity, and training a graph mixture density neural network. Subsequently, a second stage is directed towards capturing new network activity data, evaluating that newly captured network activity data using the graph mixture density neural network, and generating some detection results.

At 202, network activity data is collected. The network activity data may be collected using one or more sensing modules on switches, such as switch(es) 106 discussed above in regard for FIG. 1B. The captured data can comprise any combination of unique host identifiers, sources of communications, destinations of communications, an amount of data sent, an amount of data received, a port(s) used for a communication, a requested service, a corresponding protocol, whether a communication is a request or a response, a time of a communication, or any other relevant information. The capture of this information might be accomplished by the detection engine 112 using one or more distributed sensing modules (taps) located at one or more locations (e.g. switch(es) 106, host(s) 104*a-e*, and/or at internal network resources).

At 204, a graph representing the collected network activity is generated. There are multiple ways in which to generate a graph. For example, a graph is generated that comprises a table and an adjacency matrix, where the table represents the relevant parameters and an adjacency matrix represents the interconnection of entities represented by the relevant parameters. An illustrative example of generation of a graph representing network activity will be discussed further below in regard to FIG. 3.

At 206, the graph mixture density neural network is trained. Training will be discussed further below in regard to FIG. 4. Briefly, the graph mixture density neural network is trained using the graph representing the network activity and uses information from multiple elements in the graph to train for the generation of outputs for individual elements, without requiring that the information from multiple elements be hardcoded into a user defined feature vector. Additionally, the graph mixture density neural network is trained using data for a training time period. The training time period may comprise a sliding time window, a periodic time window, a fixed time window, or a manually adjustable time window. For instance, a training window might comprise thirty time windows which each comprising a 24-hour time period.

In some embodiments, the collected network activity 202 will also incorporate newly captured network activity data 212. For instance, training or re-training may be triggered based on any combination of a minimum/maximum time period since last training, a threshold amount of data collected, a threshold number of detection events, or any combination thereof. In some embodiments, the captured data can be maintained in a database for future use in training the machine learning process.

Additionally, whereas new network activity data 212 may be captured in any way discussed above in regard to 202, the capture of new network activity may be used as a trigger for evaluation of the newly captured network activity data using the graph mixture density neural network at 214. For example, analysis may be triggered for each new piece of network activity data, an aggregate amount of network activity data, a collection of network activity data for a time period (such as a time period matching the time period used for training or some proportion thereof) or based on one or more other criteria such as aggregate amount of data transferred over the internal network identified from the network activity data.

At 214, the information captured at 212 is evaluated to determine where the captured network activity data represents abnormal data collection. For example, the captured network activity data is compared to a corresponding set of distributions to determine whether the network activity corresponds to abnormal behavior based on it falling outside of all the predicted distributions or below a threshold level of likelihood. Additionally, in some embodiments a detection may be weakly associated with abnormal behavior. In such an event, a process may aggregate detections such that multiple weak associations as abnormal behavior rises to the level of triggering a detection of abnormal behavior.

If, for example, potentially abnormal data collection activity is identified at 214, then at 216 one or more alerts may be generated. For instance, alerts may be generated for display to an administrator (e.g. via a management interface or console, via email, text, instant message, or push notification). Additionally, alerts may be generated to other security systems and to log additional data, such as to an intrusion detection system that tracks potentially malicious activity and identifies a sequence of actions in order to increase the confidence given to a particular alert that said alert is genuine malicious network activity. In some embodiments, the potentially malicious activity comprises any of malicious activity or activity undertaken without actual malice such as abnormal, risky, or otherwise undesirable activity, and may also originate from within or outside of the internal network and be initiated by a person in the employ of, or otherwise affiliated/contracted with, a corresponding employer or from a person who is not in the employ of, or otherwise affiliated/contracted with, the corresponding employer.

Figure 3:
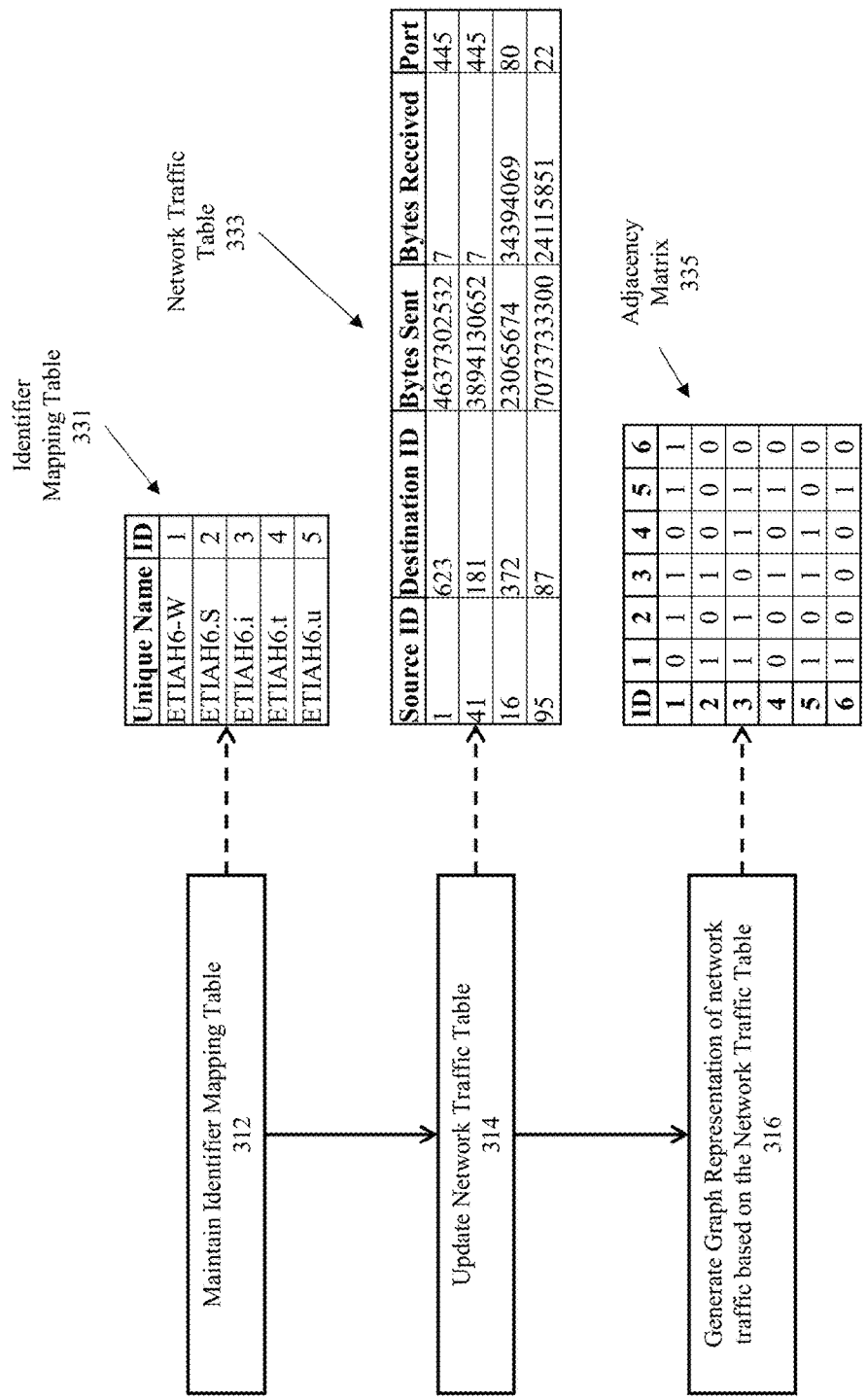
FIG. 3 illustrates an expanded view of generating a graph representing network activity of FIG. 2 according to some embodiments of the invention.

FIG. 3 illustrates an expanded view of generating a graph representing network activity of FIG. 2 according to some embodiments of the invention. Generally, the process includes uniquely identifying a device (which may comprise a host), collecting data representing communications activity over a network that each device engages in, and generating a condensed representation of which devices communicated with each other.

At 312, an identifier mapping table is maintained. In some embodiments, the mapping table comprises a name or unique name for a device and associates the name or unique name with an identifier that is only used for one particular device within the GraphMDN process. For example, identifier mapping table 331 illustrates a table having two columns and a plurality of rows. The first column corresponds to a unique name of the device, and the second column corresponds to an assigned identifier (ID) for the device. In some embodiments, the identifier mapping table 331 is updated with new names or unique names for devices and corresponding identifiers as the devices are discovered. As illustrated, identifier mapping table 331 includes only five entries. However, this is merely intended to be representative and could include any number of entries as necessary.

At 314, a network traffic table is updated. For example, the collected network activity data is transferred/copied to or maintained in a network traffic table. In some embodiments, the entries are identified by the names of the devices when they are unique. In some embodiments, the entries are maintaining in a network traffic table based on ID's assigned to respective devices. For example, network traffic table 333, as illustrated, includes five columns and multiple rows, where each column corresponds to a different type of data and each row corresponds to an entry representing one or more communications between a source and destination device. Specifically, the first column corresponds to a device ID for a source device that sent a communication to destination device, the second column corresponds to a device ID for a destination device, the third column corresponds to the bytes set by the source device, the fourth column corresponds to the bytes received, and the fifth column corresponds to the port used. In some embodiments, each communication is maintained separately where the bytes sent comprise the data transmitted, and the bytes received correspond to a response from the source device (e.g. confirmation that the data was received), where each communication/entry is associated with a time stamp or a time range. In some embodiments, the data may be aggregated for the source and destination device, where each entry corresponds to the data collected for a given training window. Additionally, in some embodiments, each entry may correspond to a different combination of a source, a destination, and a port.

At 316, a graph representation of the collected network activity is generated. In some embodiments, that representation comprises a combination of the network traffic table 333 and an adjacency matrix 335 generated based on the entries in the network traffic table 333. For example, an adjacency matrix may be generated by instantiating a matrix with each row corresponding to an ID (e.g. from identifier mapping table 331) and each column corresponding to an ID (e.g. from identifier mapping table 331), such that all IDs, or at least all active IDs as determined from the network traffic table, are represented in a horizontal and a vertical arrangement. Subsequently, the network traffic table 333 is traversed to determine which intersections of the adjacently matrix should be populated with a connection representation. For example, a transfer of data from the device having the ID 1 to the device having the ID of 2, would correspond to, at least, an intersection of the first row and the second column. Additionally, directionality of communications can be represented by the adjacency matrix because a communication from the device having the ID 2 to the device having the ID of 1, would correspond to, at least, an intersection of the second row and the first column.

Figure 4:
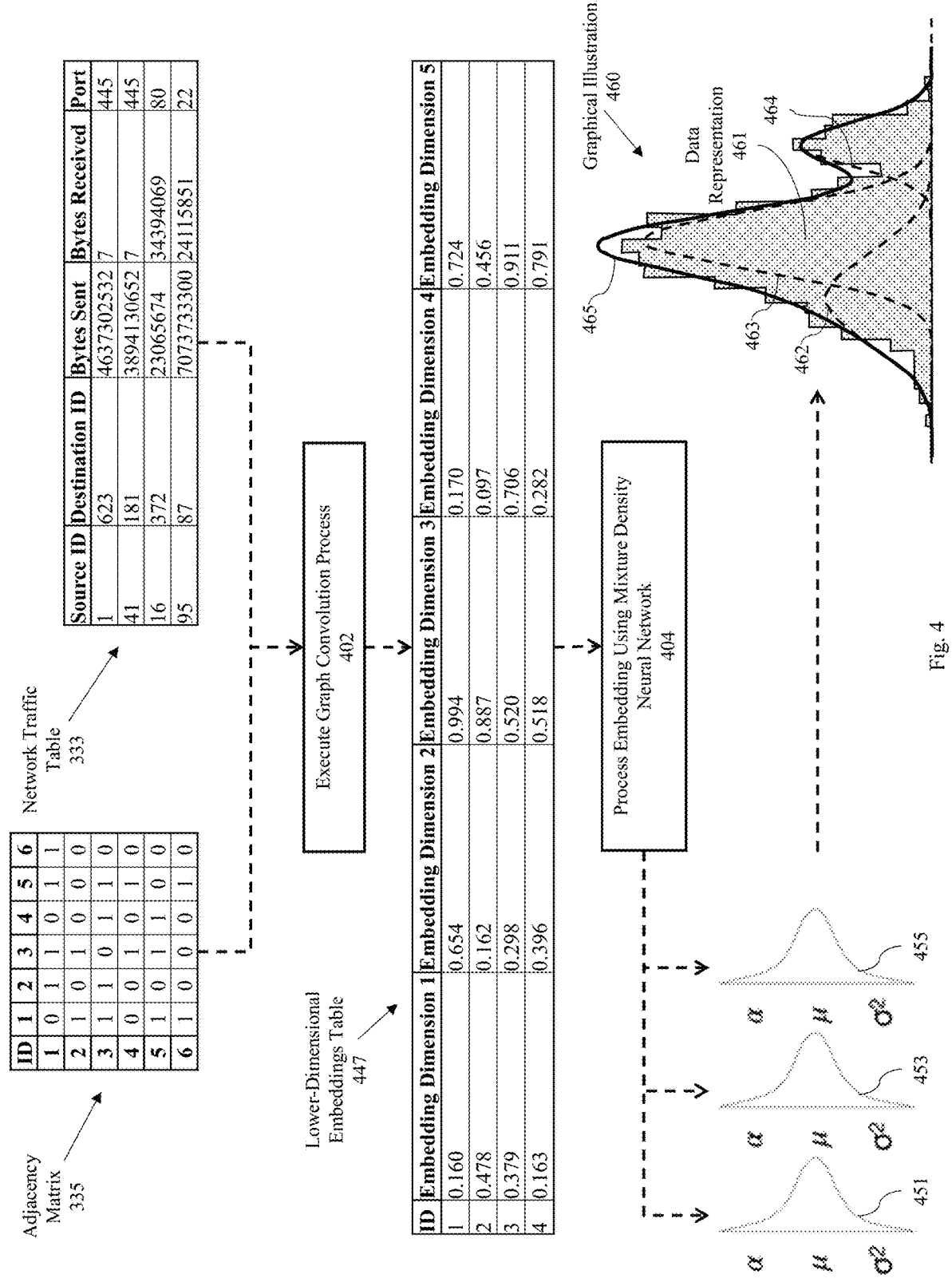
FIG. 4 illustrates an expanded view of training a graph mixture density neural network of FIG. 2 according to some embodiments of the invention.

FIG. 4 illustrates an expanded view of training a graph mixture density neural network of FIG. 2 according to some embodiments of the invention. Generally, training comprises execution of a graph convolution process to generate embedding dimensions that are then processed using a mixture density neural network.

At 402, a graph convolution process is executed using the adjacency matrix 335 and the network traffic table 333 to generate lower level embeddings for each host. Specifically, the graph (represented by 333 and 335) is fed into an input layer, and then a convolution operator "sweeps" over each node in the network, aggregating information about that node and its neighbors into a more compact form to create the values for the lower-dimensional embeddings (see e.g. lower-dimensional embeddings table 447). The graph may be traversed to generate an n-dimensional representation of each node by any combination of multiplications based on weights—e.g. a compact sequence of numbers representing each node (the embeddings). The graph convolution is so called due to the fact that 'filter' parameters are shared over all locations in the graph. That is, the same neural network parameters are used at all locations in the graph, in the same way that a kernel convolved with an input is the same as repeated application of the kernel weights at all locations over an image. Node predictions can be directly used after training, while node embeddings can be extracted from the hidden layer activations of a node itself.

The embeddings generated at 402 are then fed to a mixture density neural network at 404 (e.g. as a hidden layer connected to outputs for parameters of the target distribution), which ultimately issues predictions about the expected distribution of file transfer sizes. The result of the processing of the embeddings using the mixture density neural network at 404 may generate a number of (N) gaussian distributions and a corresponding mixing coefficient. For example, 451, 453 and 455 are each represented by a mean ($\mu$), a variance ($\sigma^2$), and a mixing coefficient ($\alpha$), where the sum of all values of each value of ($\alpha_i$) for a particular distribution add up to 1. Thus, the representation of a particular output, corresponding to a particular input, from the mixture density neural network can be represented by the mixture of each of the gaussian distributions in amounts corresponding to their respective ($\alpha$) values. Additionally, a distribution of inputs for a particular element (e.g. node) corresponds to a family of mixtures of gaussian distributions in amounts corresponding to their respective ($\alpha$) values. Graphical illustration 460 shows a distribution comprising three gaussian distributions. Specifically, the underlying data might be represented by 461, and each gaussian distribution corresponds to one of 462-464, and the mixture of these gaussian distributions correspond to 465 when mixed according to their respective values for ($\alpha$). Additionally, each node may be represented by a different family of distributions that each have the same or a different number of gaussian distributions in the underlying mixture. In some embodiments, the mixture is used to compare subsequently received traffic to determine with the traffic falls under expected behavior or whether a detection result indicating possible/probable malicious network activity (e.g. data hoarding prior to exfiltration) or otherwise abnormal behavior. By utilizing a mixture density network in conjunction with the graph neural network, the disclosed approach extends predictions from averages to distributions.

Figure 5:
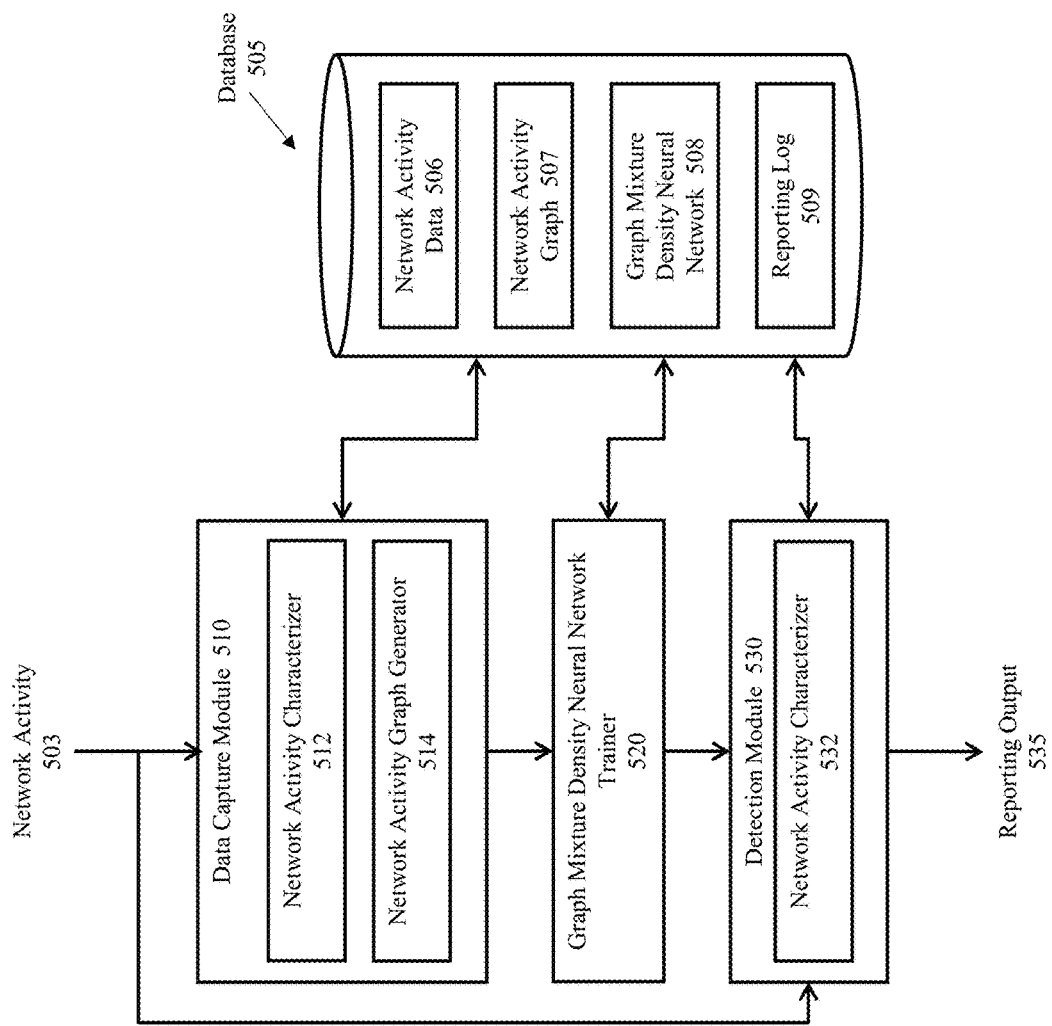
FIG. 5 illustrates a block diagram of at least some embodiments of the invention.

FIG. 5 illustrates a block diagram of at least some embodiments of the invention. Generally, the system comprises a data capture module, a graph mixture density neural network trainer, a detection module, and a database.

The data capture module 510 collects network activity (e.g. 503) and maintains it for later use in training. For example, as network activity is received, the network activity is analyzed at 512 to identify relevant parameters—e.g. the source, destination, amount of data send/received, the port used, and the time of the communication are captured and stored in network activity data 506 of the database 505. After some network activity has been captured and stored at 506, the data might be analyzed and possibly aggregated at 514 to generate a network activity graph. Aggregation of network activity data can be completed by aggregating data from the same source to the same destination, from the same destination to the same source, or for each unique combination of source and destination regardless of direction. Additionally, the network activity graph may be represented by a combination of the relevant data and an adjacency matrix. Regardless, the graph of network activity data is stored in the network activity graph area 507 of the database 505.

A graph mixture density neural network trainer 520 operates on the network activity graph stored in the network activity graph area 507 in order to train the graph mixture density neural network as discussed above. For instance, the graph of data is used to generate lower level embeddings that are then input into a mixture density neural network. The mixture density neural network processing the convoluted inputs used to generate the lower level embeddings generates families of distributions (e.g. gaussian distributions) with associated mixing coefficients for nodes or the graph. Both the trained GraphMDN and the outputs thereof can be stored in the database 505 at 508.

A detection module 530 includes a network activity characterizer 532 similar to the network activity characterizer 512. The analysis of the network activity characterizer may then be compared to a corresponding distribution from the GraphMDN to determine whether it falls within normal behavior as represented by the distribution or whether it should be considered abnormal. Additionally, the detection module 530 might execute a running average or other aggregation process to determine if weakly abnormal behavior is strongly represented to the point of suggesting abnormal behavior. Based on the analysis the detection module 530 will generate some reporting output 535 as discussed above and may also generate a reporting log at 509.

Furthermore, the GraphMDN could also be used for other purposes or functions. This is because GraphMDNs can learn improved embeddings of nodes, edges, and hosts. An example in the context of network security, would be to represent a computer network as a graph whose nodes represent hosts (or users, subnets., etc.), connected to each other by a series of edges that represent network connections (or service calls, interactions, etc.). In addition to using GraphMDNs directly for prediction tasks, learned embeddings make it possible for downstream machine learning algorithms to either cluster similar hosts/machines/users (nodes), connection-types (edges), or computer networks (graphs/sub-graphs), and enable anomaly detection models to determine when hosts, connections and networks are sufficiently dissimilar from baselines such that they may be considered to be anomalous.

In the case of graph structured data, where a graph is composed of nodes or vertices, and edges connecting them, there are three possible levels at which one might make predictions, whether classification or regression. These are at the node level (classify a node as one of K classes, or predict a regression target about that node), edge level (classify an edge as one of K classes, or predict a regression target about that edge), or even at the sub-graph and full graph levels (classify the graph as one of K classes, or predict a continuous regression value over the sub-graph or graph).

Because GraphMDNs are designed with the purpose of accurately learning to predict continuous targets over graph structured data. The system can operate over arbitrary graph structured data but extend traditional graph neural networks using outputs that parameterize a mixture of distributions as found in MDNs. The resulting mixture model is able to represent multi-valued and multi-modal distributional data better than standard graph neural networks operating in regression tasks, as well as standard deep learning architectures with MDNs that ignore structural contextual information from the graph structure itself.

While the approach illustrated herein is generally directed towards modeling node behavior, it should be noted that the GraphMDN framework can be used to make predictions about nodes, edges, and graph level data.

One example might comprise an arrangement where each node is a function in a program, and each edge represents a call from one function to another. The "weight" of each edge (a numerical property associated with the edge) might comprise a number of calls between functions. Furthermore, an entire graph of function calls for known malware samples could be used to train a network capable of ingesting the function call graph of previously unknown executables and classifying them as malware (or not malware).

Another example might comprise using a GraphMDN to predict the number of connections between computers. For example, a machine connects to other computers sporadically to push updates (1-10 times a day), but occasionally performs vulnerability scans that involve attempting to connect to a computer on all of its potentially open ports (1000 s of connections). In this scenario, the average number of connection (hundreds) is likely to be a misleading anomaly indicator, as the IT machine either connects but a few times, or many thousands of times. A GraphMDN is ideal for learning such behaviors.

Yet another example of a use case for a GraphMDN corresponds to user and entity behavior analytics (UEBA). For example, the number of logon attempts for an administrator account is likely to be multimodal in nature, with single-logons indicating sessions of personal use and one-off maintenance, and with automated maintenance producing a well-defined large number of logons roughly equal to the number of distinct computers that need to be maintained (and so require the administrator account to logon to them).

Other use cases for a GraphMDN comprise various edge predictions (data sent/received number of connections), predictions over structured data logs (e.g. operation over function call graphs in malware prediction or security information and event management (SIEM) analysis, or even UEBA over a number of times user appears on service or cloud access security broker (CASB) analysis Therefore, what has been described is an improved approach for detecting malicious network activity using a graph mixture density neural network. In particular, the approach described herein learns complex hierarchical feature representations of graph-based data including providing multi-modal distributions and families of distributions of the multiple target values given some input value.

System Architecture Overview

Figure 6:
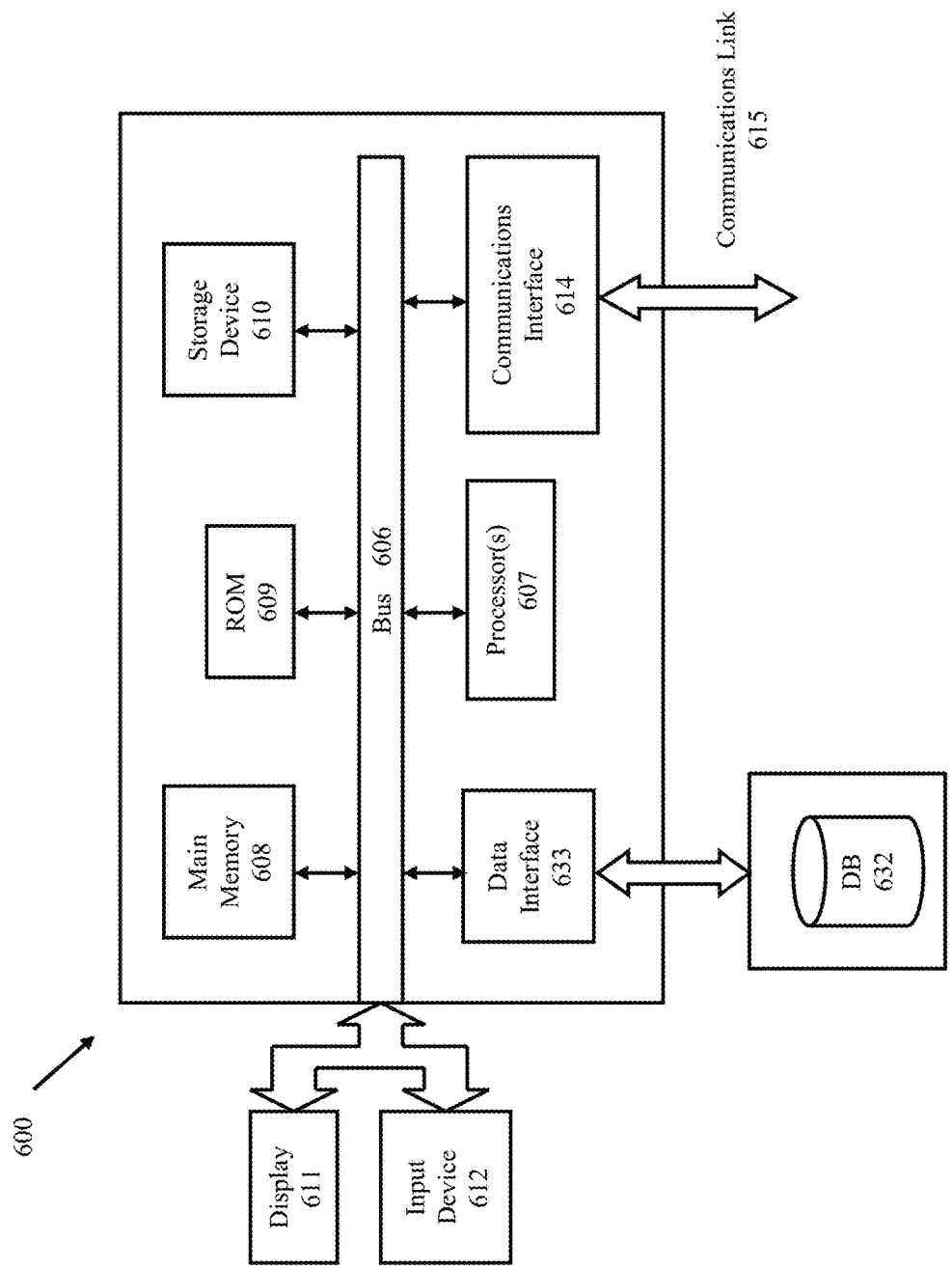
FIG. 6 is a block diagram of an illustrative computing system suitable for implementing an embodiment of the present invention.

FIG. 6 is a block diagram of an illustrative computing system 600 suitable for implementing an embodiment of the present invention. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control.

According to one embodiment of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, e.g., application code, through communication link 615 and communication interface 614. Received program code may be executed by processor 607 as it is received, and/or stored in disk drive 610, or other non-volatile storage for later execution. Computer system 600 may communicate through a data interface 633 to a database 632 on an external storage device 631.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
collecting network activity data;
generating a graph representing network activity based on at least the network activity data; and
training a graph mixture density neural network based on the graph representing network activity by executing a graph convolution process on the graph representing network activity to generate embeddings and processing the generated embeddings using a mixture density neural network.

2. The method of claim 1, wherein the graph mixture density neural network generates multiple gaussian distributions, and a gaussian distribution comprises at least a respective mixing coefficient.

3. The method of claim 1, further comprising:
evaluating additional network activity using the graph mixture density neural network; and
generating detection results based on at least the evaluation of the additional network activity using the graph mixture density neural network.

4. The method of claim 3, wherein the detection results indicate that a host inside a network is identified as a staging point for collection of data prior to possible exfiltration to another host.

5. The method of claim 4, wherein the other host is external of the network.

6. The method of claim 3, wherein a host is identified as a staging point based on analysis of network activity against a plurality of distributions generated by the graph mixture density neural network.

7. The method of claim 3, wherein a detection result is associated with a confidence level.

8. The method of claim 1, further comprising:
capturing additional network activity data; and
updating the graph representing network activity to include a capture the additional network activity data.

9. The method of claim 1, wherein the graph representing the network activity is maintained using at least one of a source identifier, a destination identifier, an adjacency matrix, or a network traffic table representing characteristics of communications between a source and a destination.

10. The method of claim 9, wherein a respective source identifier corresponds to a uniquely named resource and the respective destination corresponds to a different uniquely named resource.

11. The method of claim 1, wherein the network activity data comprises unique host identifiers, sources of communications, destinations of communications, an amount of data sent, an amount of data received, a port(s) used for a communication, a requested service, a corresponding protocol, whether a communication is a request or a response, or a time of a communication.

12. A non-transitory computer readable medium having stored thereon a sequence of instructions, the sequence of instructions, when executed, causing a set of acts comprising:
    collecting network activity data;
    generating a graph representing network activity based on at least the network activity data; and
    training a graph mixture density neural network based on the graph representing network activity by executing a graph convolution process on the graph representing network activity to generate embeddings and processing the generated embeddings using a mixture density neural network.

13. The computer readable medium of claim 12, wherein the graph mixture density neural network generates multiple gaussian distributions, and a gaussian distribution comprises at least a respective mixing coefficient.

14. The computer readable medium of claim 12, wherein the set of acts further comprise evaluating:
    evaluating additional network activity using the graph mixture density neural network; and
    generating detection results based on at least the evaluation of the additional network activity using the graph mixture density neural network.

15. The computer readable medium of claim 14, wherein the detection results indicate that a host inside a network is identified as a staging point for collection of data prior to possible exfiltration to another host.

16. The computer readable medium of claim 15, wherein the other host is external of the network.

17. The computer readable medium of claim 14, wherein a host is identified as a staging point based on analysis of network activity against a plurality of distributions generated by the graph mixture density neural network.

18. A system comprising:
    a memory storing a set of instructions; and
    a processor to execute the set of instructions to perform a set of acts comprising:
        collecting network activity data;
        generating a graph representing network activity based on at least the network activity data; and
        training a graph mixture density neural network based on the graph representing network activity by executing a graph convolution process on the graph representing network activity to generate embeddings and processing the generated embeddings using a mixture density neural network.

19. The system of claim 18, wherein the graph mixture density neural network generates multiple gaussian distributions each with a respective mixing coefficient.

20. The computer readable medium of claim 12, wherein the graph representing the network activity is maintained using at least one of a source identifier, a destination identifier, an adjacency matrix, or a network traffic table representing characteristics of communications between a source and a destination.

* * * * *